US012209434B2

(12) United States Patent
Vertuoso

(10) Patent No.: US 12,209,434 B2
(45) Date of Patent: Jan. 28, 2025

(54) LATCH WITH ADJUSTABLE CAM

(71) Applicant: Industrilås i Nässjö Aktiebolag, Nässjö (SE)

(72) Inventor: Sidney Ricardo Vertuoso, Nässjö (SE)

(73) Assignee: Industrilas | Nassjo Aktiebolag, Nassjo (SE)

( * ) Notice: Subject to any disclaimer, the term of this patent is extended or adjusted under 35 U.S.C. 154(b) by 184 days.

(21) Appl. No.: 17/915,918

(22) PCT Filed: Apr. 3, 2020

(86) PCT No.: PCT/EP2020/059566
§ 371 (c)(1),
(2) Date: Sep. 29, 2022

(87) PCT Pub. No.: WO2021/197616
PCT Pub. Date: Oct. 7, 2021

(65) Prior Publication Data
US 2023/0144968 A1 May 11, 2023

(51) Int. Cl.
*E05B 63/00* (2006.01)
*E05B 35/00* (2006.01)
*E05C 3/04* (2006.01)

(52) U.S. Cl.
CPC .......... *E05B 63/006* (2013.01); *E05B 35/008* (2013.01); *E05C 3/042* (2013.01)

(58) Field of Classification Search
CPC .... E05B 63/00; E05B 63/0056; E05B 63/006; E05B 35/00; E05B 35/008; E05C 3/00; E05C 3/02; E05C 3/04; E05C 3/041; E05C 3/042; E05C 3/043
USPC .......................................................... 70/57
See application file for complete search history.

(56) References Cited

U.S. PATENT DOCUMENTS 2,066,541 A * 1/1937 Schenk ............... F16B 37/0814 269/180
4,492,394 A * 1/1985 Dignan ................... E05C 3/042 292/64
6,041,627 A * 3/2000 Buckland ............ E05B 17/0025 292/DIG. 60
8,459,703 B2 * 6/2013 Anderson ........... E05B 63/0056 292/63
(Continued)

FOREIGN PATENT DOCUMENTS

DE 2020 13004046 * 8/2014
DE 202013004046 U1 8/2014
GB 2 159 868 * 12/1985
(Continued)

*Primary Examiner* — Nathan Cumar
(74) *Attorney, Agent, or Firm* — Volpe Koenig

(57) ABSTRACT

The present invention relates to a latch for arrangement on a door and locking the door relative to a door frame is provided. The latch comprises an attachment part configured to be arranged on the door, a latch shaft extending from the attachment part, and a cam arranged on the latch shaft, wherein the latch shaft, when the latch is arranged to the door, is rotatable relative to the door to rotate the cam between an open position in which the door is openable relative to the door frame, and a closed position in which the door is locked to the door frame. The cam can be in an open state or in a locked state, and the axial position of the cam on the latch shaft is adjustable when the cam is in the open state.

10 Claims, 8 Drawing Sheets

(56) References Cited

U.S. PATENT DOCUMENTS

2023/0144968 A1* 5/2023 Vertuoso ............... E05B 63/006
70/57

FOREIGN PATENT DOCUMENTS

| | | | |
|---|---|---|---|
| GB | 2159868 | A | 12/1985 |
| WO | 2017182541 | A1 | 10/2017 |
| WO | WO-2017182541 | * | 10/2017 |

* cited by examiner

LATCH WITH ADJUSTABLE CAM

TECHNICAL FIELD

The present disclosure relates to a latch for a door, and especially a latch for a door with an adjustable cam.

BACKGROUND

A conventional latch for a door usually has custom-made measurements for arrangement on a specific door, meaning that the latch is customized for a specific distance between a door and a door frame, the door being in a closed state. The latch is usually also provided to fit a specific thickness of a door.

Different doors having varying measurements lead to a need for a specific latch arrangement for a specific door, depending on the thickness of the door and the offset distance between the door and the door frame. The latches need do be custom-made in order to fit specific door arrangements, leading to a need for producing many different latches for closing, opening and locking the doors. This poses a problem, thus producing many different latches for different doors is both cost and time inefficient.

Hence, there is a need for a more efficient and flexible system of providing door latches to be arranged on doors with different dimensions.

SUMMARY

It is an object of the present invention to provide an improved solution that alleviates the mentioned drawbacks with present devices. Furthermore, it is an object to provide a latch for a door having properties suiting different door arrangements in an efficient way. That is, creating a more secure connection between the door frame and the door with no need for a latch device being specifically dimensioned for doors with different measurements and doors and door frames with different offset distances. Thereby, by providing a latch with an adjustable cam, a reduction of manufacturing time and costs due to an all-round solution may be achieved. The latch being adjustable may also provide a well-fitting solution for many doors. The invention is defined by the appended independent claims, with embodiments being set forth in the appended dependent claims, in the following description and in the drawings.

According to a first aspect of the invention, a latch for arrangement on a door and locking the door relative to a doorframe is provided. The latch comprises an attachment part configured to be arranged on the door, a latch shaft extending from the attachment part, and a cam arranged on the latch shaft, wherein the latch shaft, when the latch is arranged to the door, is rotatable relative to the door to rotate the cam between an open position in which the door is openable relative to the door frame, and a closed position in which the door is locked to the door frame. The cam can be in an open state or in a locked state, and the axial position of the cam on the latch shaft is adjustable when the cam is in the open state.

By the axial position being adjustable when the cam is in the open state is meant that the cam may be adjusted in its axial position relative to the latch shaft, more specifically along the latch shaft. When the desired position is achieved, the latch cam may be brought into a closed state and thereby fixate the latch cam in a position wherein the latch is secured to function as intended. In the closed state of the cam, the cam may be both axially and rotationally fixed relative to the latch shaft. In the open state, the cam may be adjustable at least axially relative to the latch shaft. By the cam having an open state and a closed state it may be meant that the cam itself may be structurally or functionally changed to be brought into either of the states. It may be that a part of the cam is moved, operated or manipulated to bring the cam into the closed state to fix the axial position of the cam, or into the open state to enable axial adjustment of the cam.

According to an embodiment, the cam comprises an openable cam lock, wherein in an unlocked position of the cam lock, the cam is in the open state and is axially moveable relative to the latch shaft, and in a locked position of the cam lock, the cam is in the locked state and is axially fixed relative to the latch shaft. The cam lock may be operated by a user with the intention to bring the cam into the open position or the closed position. The cam lock may thereby enable an adjustment of the axial cam position to fit the present door and door frame arrangement. The cam lock may provide an easy operation to bring the cam into the locked state or the open state.

According an embodiment, the cam may comprise an opening through which the latch shaft is configured to extend. In the locked position of the cam lock the width of the opening may be reduced compared to the unlocked position.

An advantage of the above embodiment is that the distance between the cam and the attachment part is adjustable, enabling attachment to doors with different arrangement relative a door frame without the need of providing a different latch with specific dimensions separately for each door and door frame arrangement. Another advantage is that the latch shaft can be effortlessly assembled manually.

According to one embodiment, the cam may comprise a lock slit extending from the opening to the cam lock. The cam lock may be provided as a snap lock. The lock slit may enable the cam lock to be closed more easily and to provide a more secure fit when fixing the latch shaft.

According to another embodiment, the cam lock, in the locked position, may be configured to press the parts of the cam at respective sides of the lock slit to at least partly close the lock slit.

The lock slit may provide two arms extending on respective sides of the lock slit from the opening towards the cam lock. The two arms may provide extensive flexibility for widening or for tightening the opening. The widened opening may facilitate assembling and adjustment of the cam on the latch shaft. When the cam lock is locked, the two arms may be pressed towards each other so that the lock slit is reduced.

According to one embodiment, the cam may comprise at least one additional slit extending from the opening. The additional slits may provide flexibility in the size of the latch opening, thereby further improving the function of the cam lock fixating the axial position of the cam when in the locked position.

According to another embodiment, the latch shaft may comprise a plurality of indentations axially separated, and wherein the cam may comprise, at an inner surface of the opening, at least one projection configured to interact with at least one of said indentations when the cam is in the locked state. The projection may be shaped to effectively interact with an indentation. The projection may extend radially from the inner surface towards a center of the opening. The projection may interact with an indentation when the cam is in the locked state in a way that the cam is axially fixed relative to the latch shaft. In the open state of the cam, the cam may be axially moveable along the latch shaft to be aligned with either of the indentations. By having one projection on the inner surface of the opening on the cam, and a plurality of indentations axially spread out along the latch shaft, the cam may in its locked state by axially fixed relative to the latch shaft in a plurality of axial positions, corresponding to the number of axially separated indentations on the latch shaft.

According to a further embodiment, the plurality of indentations may be arranged as a first section in which the indentations may be axially separated and circumferentially aligned along the circumference of the latch shaft. The indentations in the first section may thereby be provided in a row along the longitudinal extension of the latch shaft. All indentations in the first section may be configured to interact with a common projection, providing different axial positions of the cam along the latch shaft. The latch shaft may further comprise an additional second section of indentations comprising a plurality of axially separated indentations circumferentially aligned along the circumference of the latch shaft. The indentations of the two sections may further be circumferentially separated. The cam may further comprise at least two projections on the inner surface of the opening at positions along the circumference of the opening corresponding to the circumferential positions of the first and second sections of indentations. By having two or more sections of indentations along the circumference of the latch shaft, configured to interact with corresponding two or more projections on the cam, the fixation of the cam along the latch shaft when the cam is in the locked position may be further stabilized.

The indentations may be formed as substantially half-ellipsoidal, half-spherical, rectangular or any other shape adapted to receive a correspondingly shaped projection or projections on the cam.

According to one embodiment, the latch may comprise an opening in the cam which is circular shaped with a cut flat portion, and the latch shaft may have a cross-sectional shape being circular with a cut flat portion. The latch of this embodiment may have an advantage of providing a secure fastening of the latch shaft, preventing the shaft from rotating in relation to the cam. The cross-sectional shape of the latch shaft may correspond to the shape of the opening in the cam. The prevention of rotation of the cam relative to the latch shaft further provides an alignment of any projection on the inner surface of the opening with indentations on the latch shaft.

In one embodiment, the attachment part may comprise an indication means to indicate the direction of the cam. This direction may be the same direction as the cut flat portion of the latch shaft and the opening in the cam. The indication means may provide the advantage of indicating the position of the cut flat portion, to help with the installation of the latch lock.

According to a further embodiment of the latch, there may be at least one projection at the inner surface of the opening in the cam, arranged on the cut flat portion of the opening, and a first section of indentations on the latch shaft may be arranged on the cut flat portion of the latch shaft. Interacting projection and indentations on the cut flat portion of the otherwise circular latch shaft and opening may provide an improved interaction function between the two components.

According to one embodiment, the cam may extend in a direction perpendicular to the longitudinal extension of the latch shaft. The cam may extend in said direction in a first portion and a second portion. The first portion may be configured to be attached to the latch shaft and the second portion may be configured to, when in use, interact with the door frame in the closed position. The second portion may be offset the first section along the direction of the longitudinal extension of the latch shaft. The offset portions of the embodiment may provide an option to use the latch cam in reversed directions, creating a further variation in distance, providing for a larger variety of different embodiments of doors and door frames.

According to one embodiment, the latch may comprise a cam having an end portion thereof which is configured to, when in use, interact with the door frame in the closed position, comprising a hold projection configured to interact with a corresponding opening or recess which may be provided in the door frame.

The recess or opening may be designed to interact with the hold projection in a pliable way, allowing the interaction to occur in a way providing a secure locking or closing of the door. By secure locking or closing it is meant that the user may be provided with visual, sensible or auditory confirmation of the closing/locking of the door. The interaction between a hold projection and a recess or opening on the door frame may further prevent unintentional rotation of the latch from the closed position of the door towards the open position of the door.

According to a second aspect of the present invention, a door arrangement is provided, comprising a door frame, a door openable relative to the door frame, and a latch according to any of the embodiments presented above. The door arrangement may be configured to enable or prevent opening of the door relative to the door frame when in the open position or in the closed position.

BRIEF DESCRIPTION OF THE DRAWINGS

The invention will in the following be described in more detail with reference to the enclosed drawings, wherein.

Figure 9:
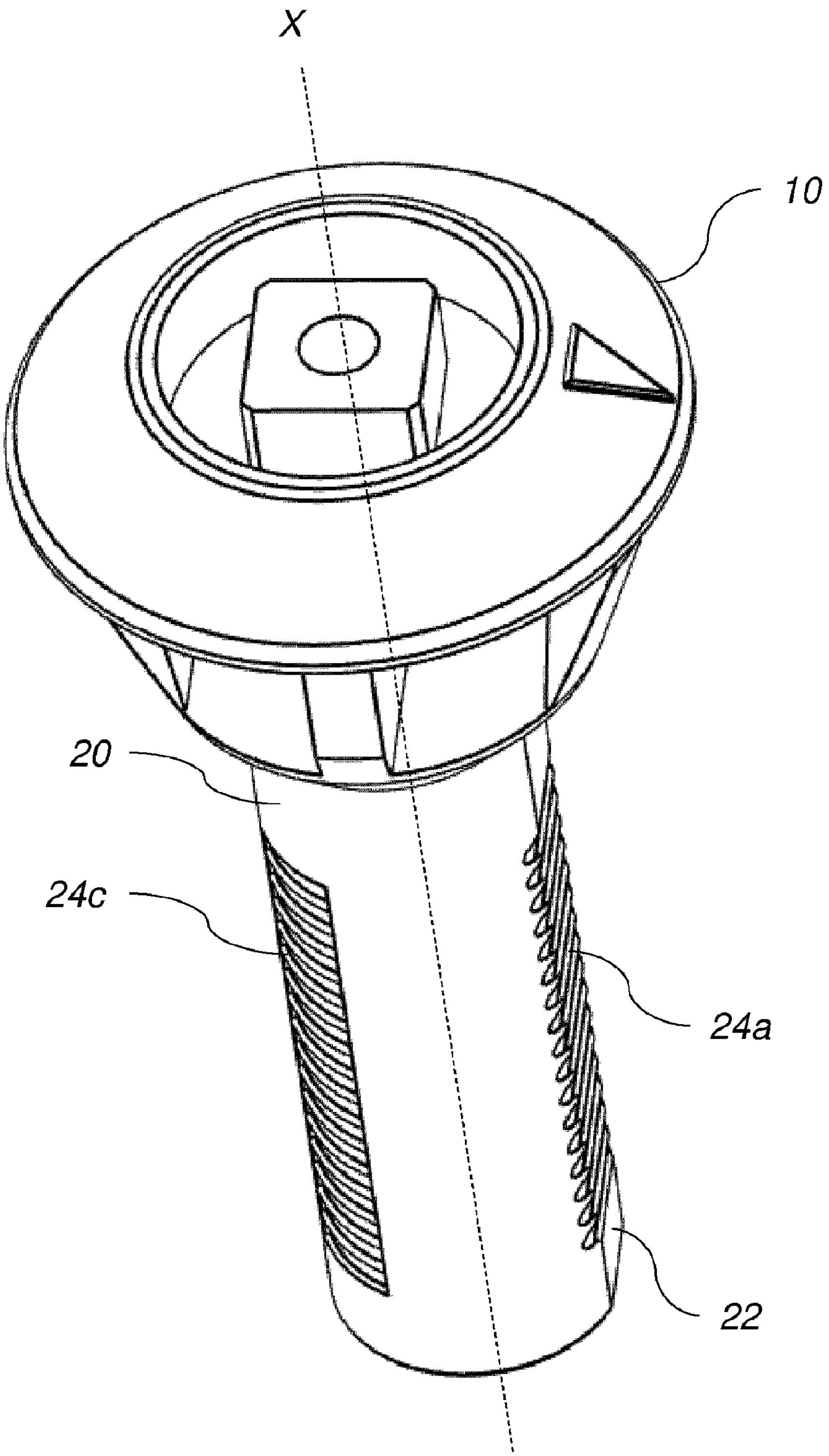
Figure 10:
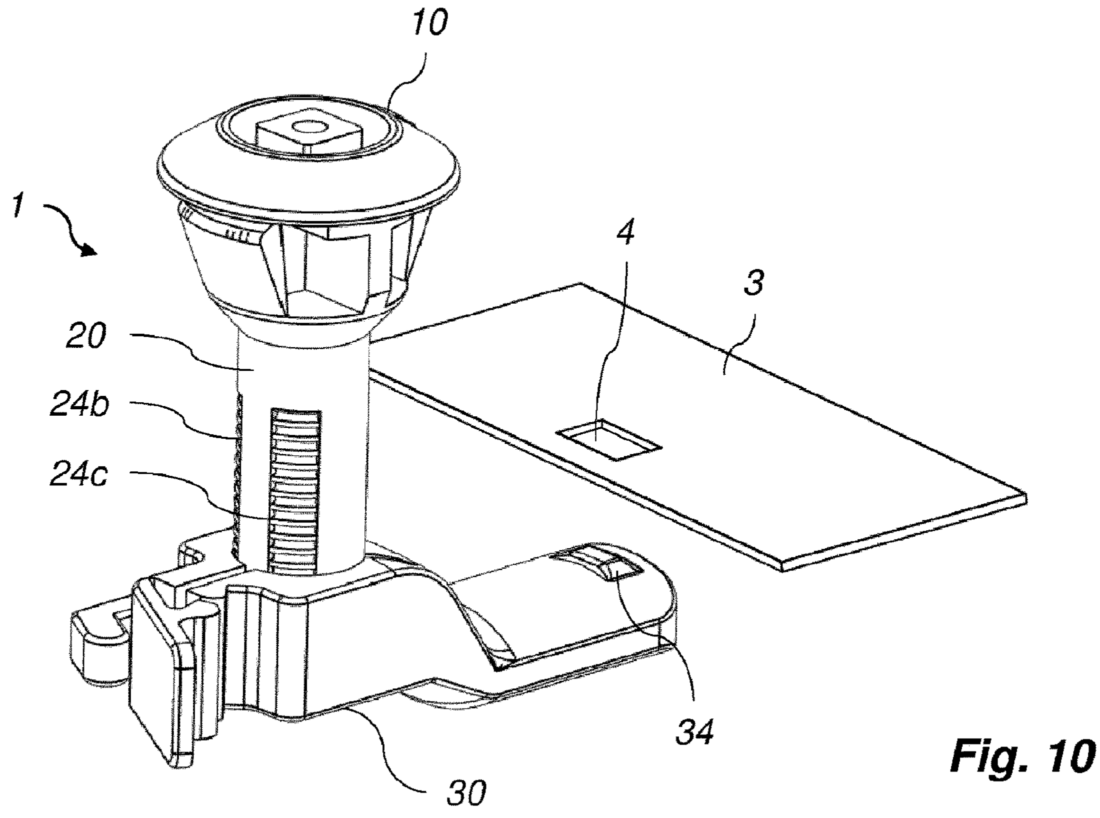
Figure 11:
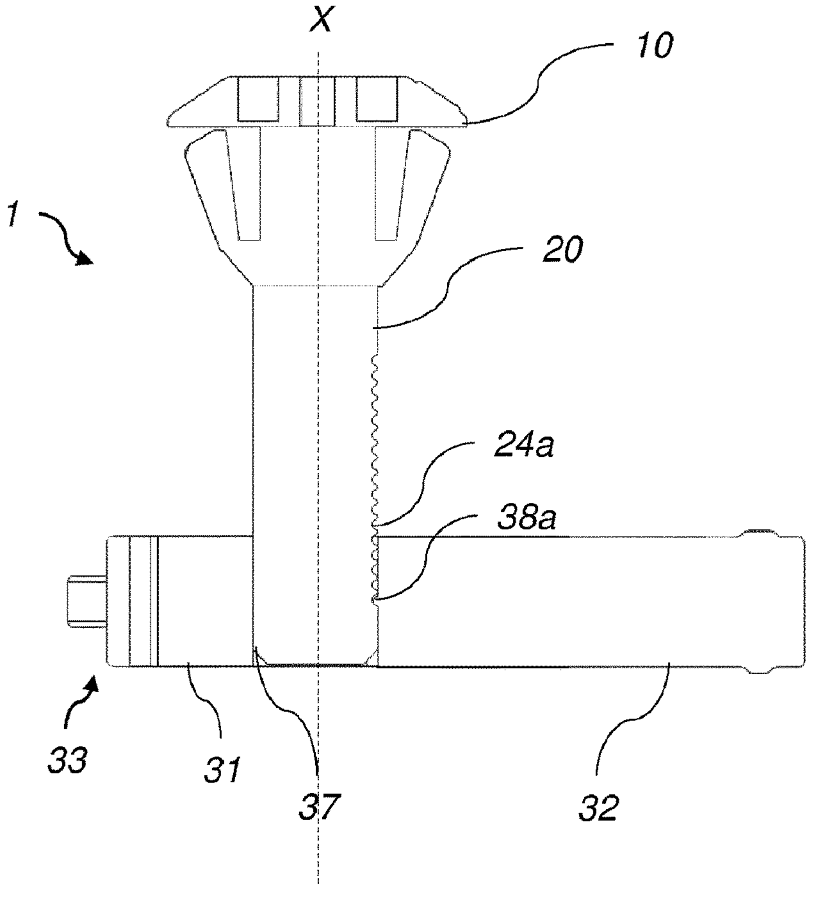
Figure 12:
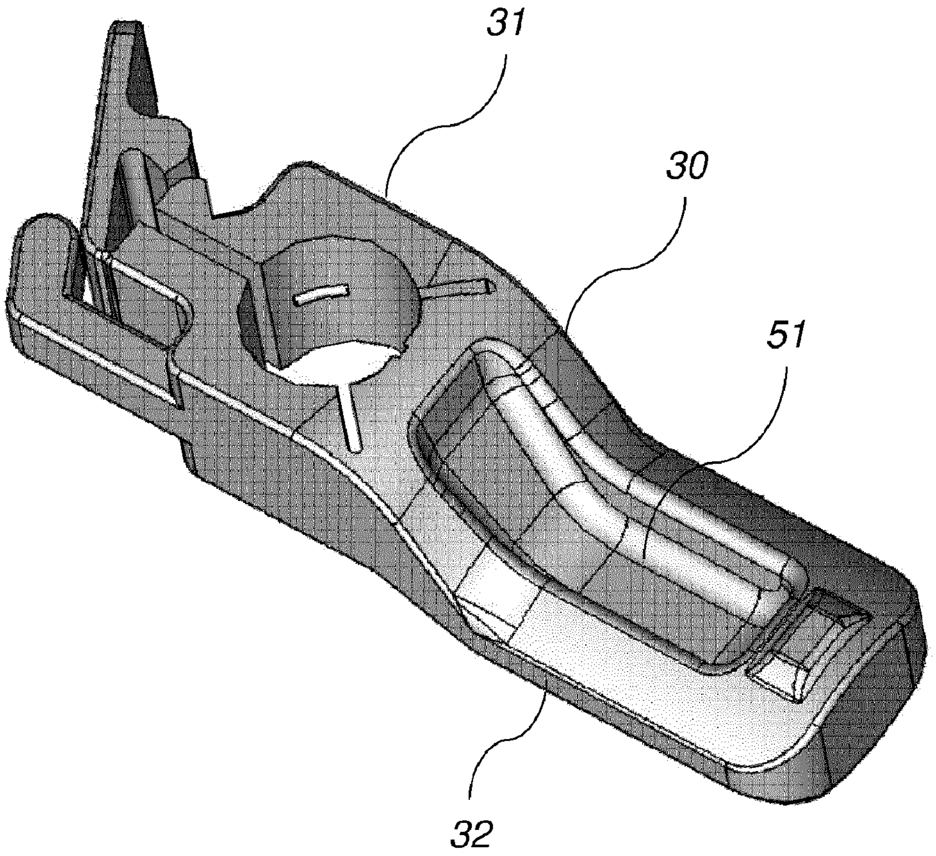

FIG. **8*a*** shows a top view of a latch according to an embodiment of the invention;

FIG. **8*b*** shows a top view of a latch according to an embodiment of the invention;

FIG. 9 shows a perspective view of a latch shaft according to an embodiment of the invention;

FIG. 10 shows a perspective view of a latch according to an embodiment of the invention;

FIG. 11 shows a cross-sectional side view of a latch according to an embodiment of the invention; and FIG. 12 shows a perspective view of a cam according to an embodiment of the invention.

DESCRIPTION OF EMBODIMENTS

The present invention will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
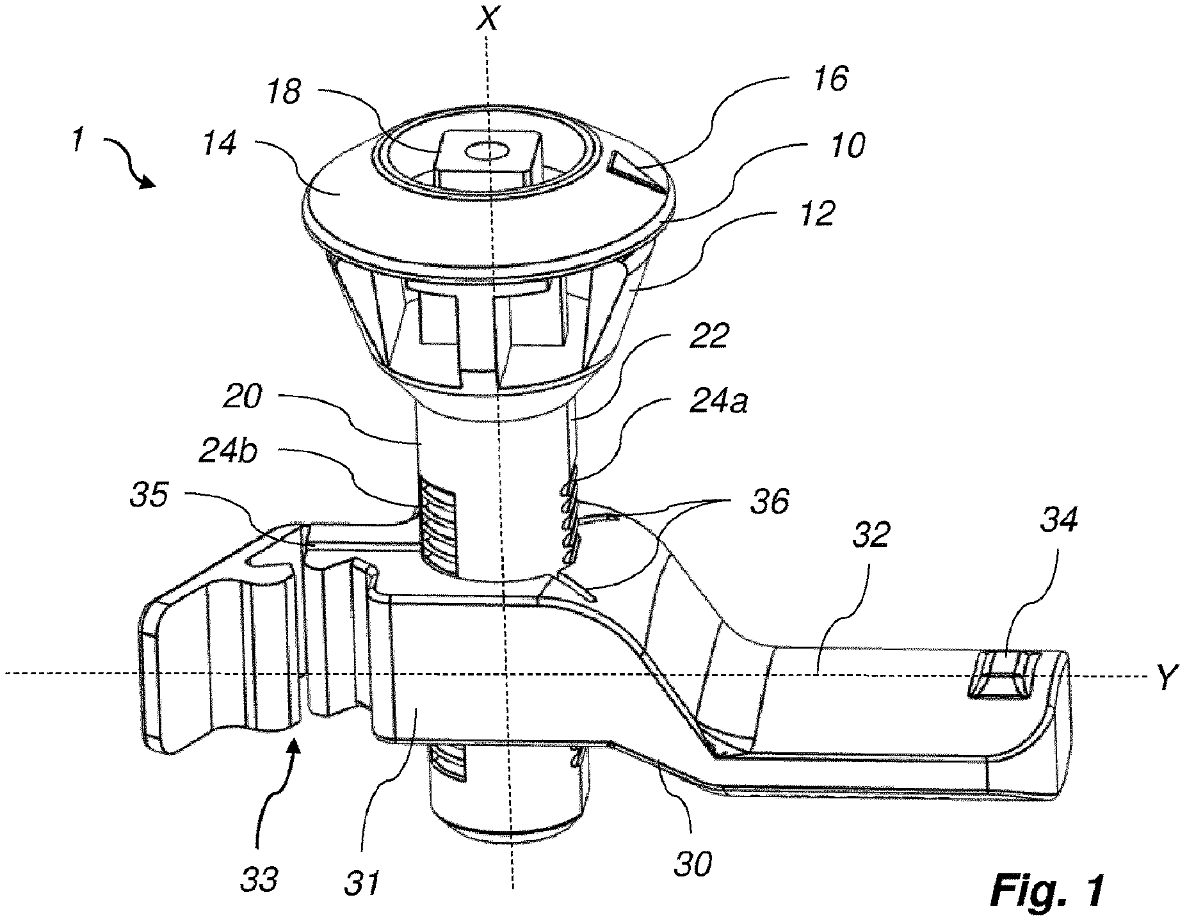
FIG. 1 shows a perspective view of a latch according to an embodiment of the invention.
Figure 2:
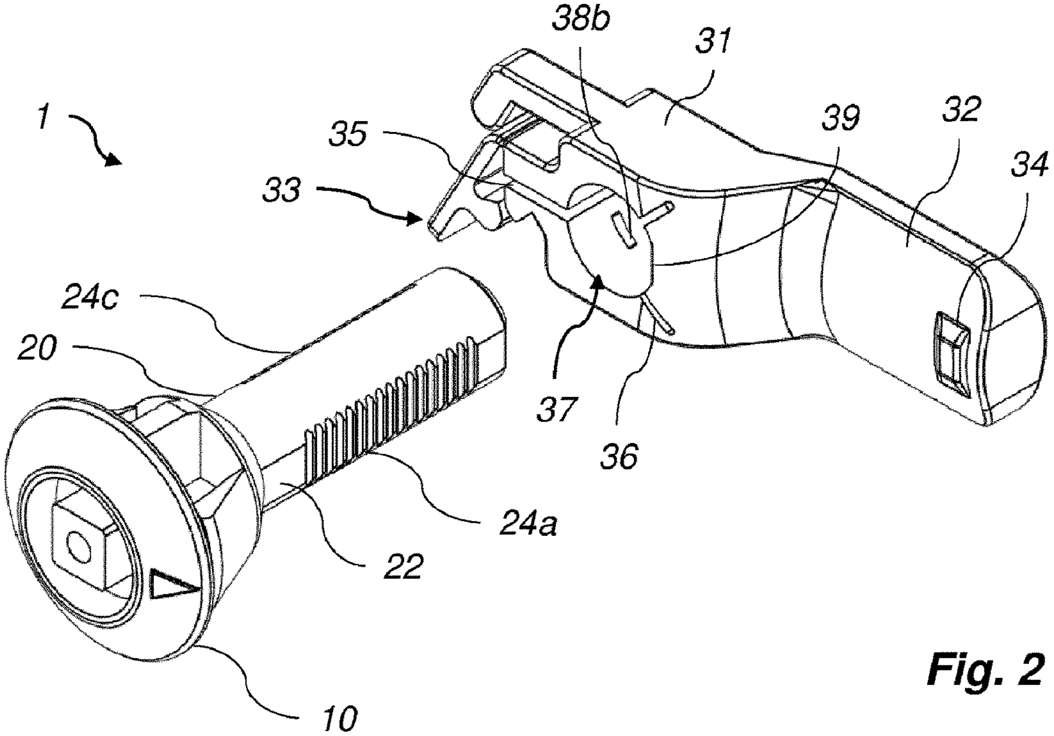
FIG. 2 shows a perspective view of a latch according to an embodiment of the invention.

FIG. 1 illustrates the latch 1 according to an embodiment of the present invention. The latch 1 comprises an attachment part 10, a latch shaft 20 and a cam 30. The attachment part 10 is configured to attach the latch 1 to a door 2. The attachment part 10 comprises resilient flanges 12 which fixes the latch 1 to the door 2 when the latch 1 has been arranged thereto. The attachment part 10 is, when the latch 1 is arranged to the door 2, pressed through a hole in the door 2, such that the resilient flanges 12 are pressed inwards towards a center of the attachment part 10. When the resilient flanges 12 have passed through the hole in the door 2, they spring out to an initial position, preventing the attachment part 10 to be removed from the hole. The attachment part 10 further comprises an attachment ring 14. When the attachment part 10 is arranged to the door 2, the attachment ring 14 is arranged on an outside of the door 2, while the resilient flanges 12 are arranged at an inside of the door 2. Together, the attachment ring 14 and the resilient flanges 12 fix the attachment part 10 and the latch 1 to the door 2. The attachment ring 14 comprises an indicator 16 showing the direction of the cam 30. The attachment part 10 further comprises an actuator means 18. The actuator means may be a key hole, a handle, a tool actuator or the like, configured to be operated by a user to rotate the latch 1.

The latch shaft 20 is attached to the attachment part 10. The latch shaft 20 and the latch shaft 10 are rotationally fixed relative to each other. Hence, when the actuator means 18 is operated to rotate the latch 1, the latch shaft 20 is rotated. The latch shaft 20 has a cross-section being circular with a cut flat portion 22. The latch shaft 20 extends along a longitudinal direction X.

The cam 30 extends along a direction Y being perpendicular to the direction X. The cam 30 comprises an opening 37 through which the latch shaft 20 extends. The cam 30 is openable using a cam lock 33. The cam lock 33 can be opened and closed to and from an opened position and a closed position. In the closed position, the opening 37 is smaller than in the open position. The latch shaft 20 extending through the opening 37 is thereby locked relative to the cam 30 when the cam lock 33 is in the closed position.

From the opening 37 to the cam lock 33, a lock slit 35 extends. The lock slit 35 provides two arms extending on respective sides of the lock slit 35 from the opening 37 towards the cam lock 33. In the closed position, the cam lock 33 provides the two arms to be pressed towards each other, reducing the width of the lock slit 35. To additionally provide flexibility in the size of the opening 37 when the cam lock 33 is either closed or open, the cam 30 comprises one or more additional slits 36 extending from the opening 37. The additional slits 36 may extend towards an edge of the cam 30.

Figure 6:
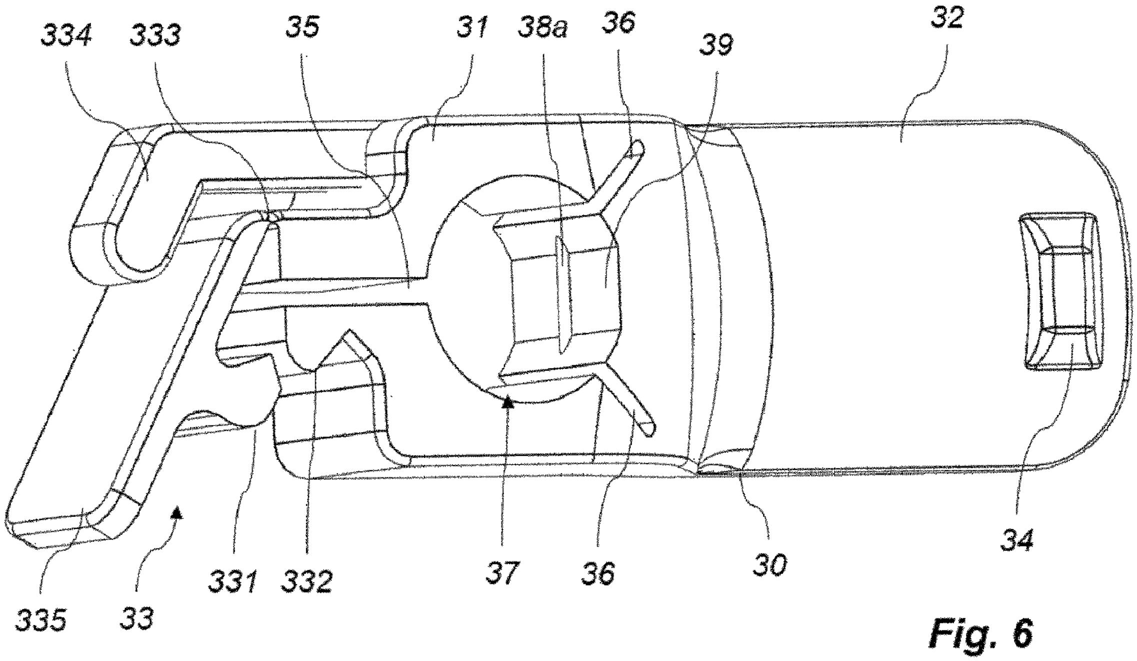
FIG. 6 shows a perspective view of a cam according to an embodiment of the invention.
Figure 7:
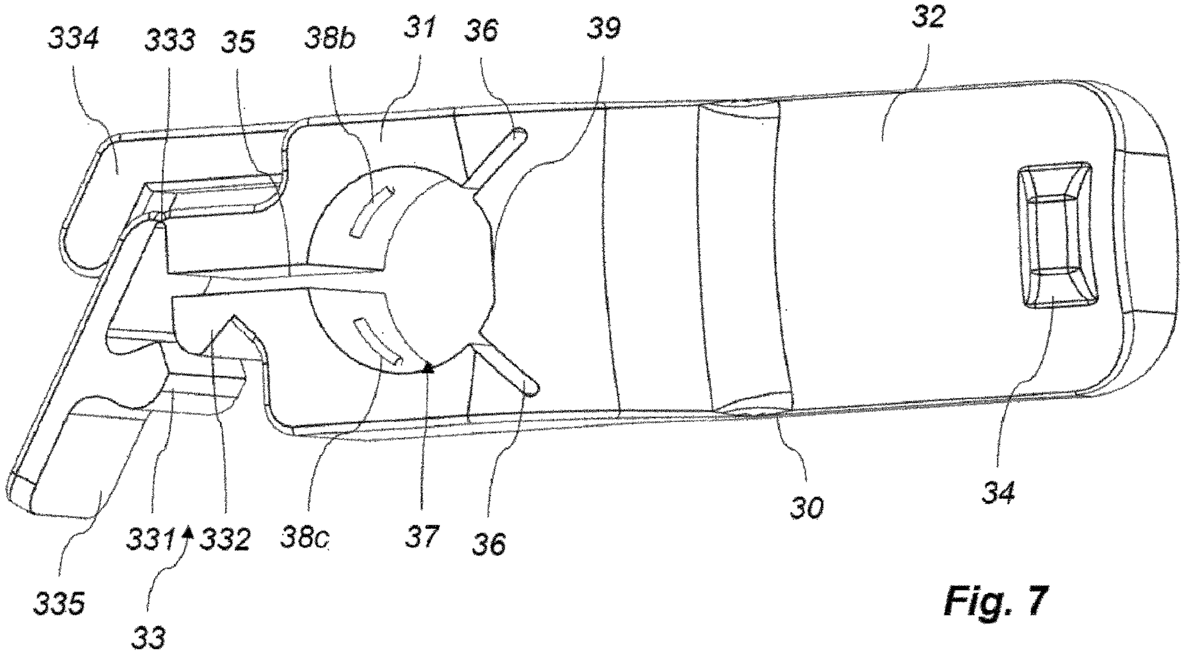
FIG. 7 shows a perspective view of a cam according to an embodiment of the invention.
Figure 8A:
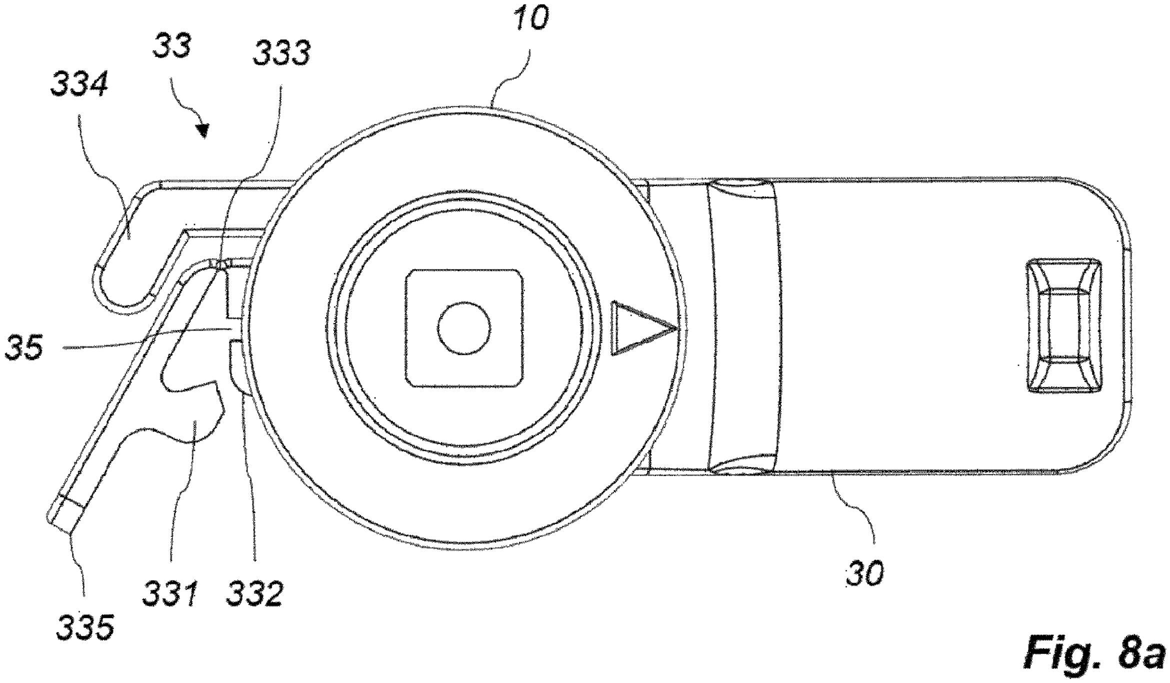
Figure 8B:
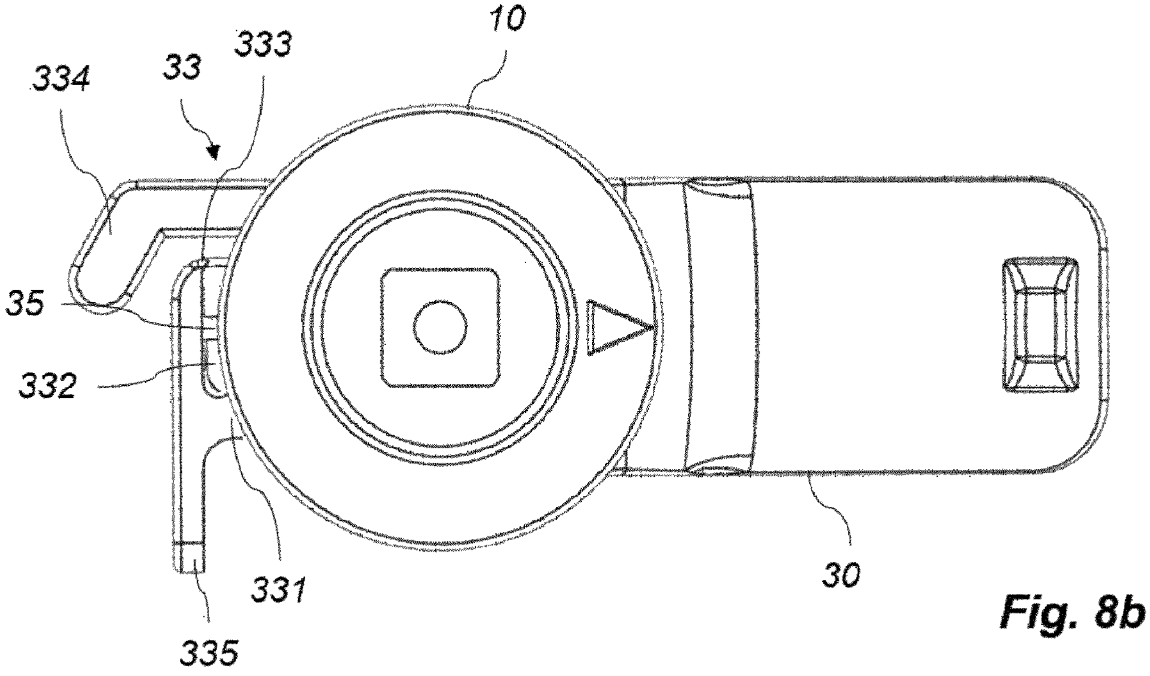

The cam lock 33 is provided in the form of a snap lock. As further illustrated in FIGS. 6 and 7, the cam lock 33 comprises a hook member 331 which is configured to snap onto a catch member 332 in the closed position of the cam lock 33. The hook member 331 is arranged on a lip member 335 which is connected to the rest of the cam 30 via a hinge 333. The hinge 333 may be formed from a thickness of the material of the cam 30 necessary to provide the desired hinge function. The cam lock 33 further comprises a stop member 334 arranged behind the lip member 335. The stop member 334 is configured to prevent the lip member 335 from being lifted or opened too far which might otherwise cause damage to the cam lock 33, or conflict with other parts of a door arrangement.

The opening 37 is circular with a cut flat portion 39. This shape of the opening 37 provides, in combination with the corresponding shape of the cross-section of the latch shaft 20, that the latch shaft 20 is rotationally fixed relative to the cam 30, and that the latch shaft can be inserted into the opening 37 in only one predetermined rotational position.

The latch shaft 20 comprises at least one groove section. In the illustrated embodiment, the latch shaft 20 comprises three groove sections 24*a*, 24*b*, 24*c*. Each groove section 24*a*, 24*b*, 24*c* comprises a plurality of grooves. The grooves in a groove section 24*a*, 24*b*, 24*c* are axially separated along the longitudinal direction X of the latch shaft 20. The grooves may be axially separated but arranged axially adjacent to each other. The grooves of a groove section 24*a*, 24*b*, 24*c* extend along a common portion of the circumference of the latch shaft 20. The grooves of a groove section 24*a*, 24*b*, 24*c* are separated along the circumference of the latch shaft 20 from the grooves of another groove section 24*a*, 24*b*, 24*c*. A first groove section 24*a* is arranged on the cut flat portion of the latch shaft 20.

The cam 30 comprises, at an inner surface of the opening 37, one or more projections 38. The number of projections 38 correspond to the number of groove sections 24*a*, 24*b*, 24*c* on the latch shaft 20. Each projection 38 is elongated along the circumference of the opening 37. Each projection 38 extend along a portion of the circumference of the opening 37. In case of several projections 38*a*, 38*b*, 38*c*, the projections are separated from each other along the circumference of the opening 37. One projection 38*a* is arranged on the cut flat portion 39 of the opening. All projections 38*a*, 38*b*, 38*c* are arranged at a common axial level in the opening 37.

The cam 30 comprises a first portion 31 at which the opening 37 through which the latch shaft 20 extends is provided. The cam further comprises a second portion 32 which interacts, when the latch is arranged to a door 2 and is in the closed position, with the door frame 3. The cam 30 extends in a direction Y being perpendicular to the longitudinal direction X of the latch shaft 20. The second portion 32 of the cam 30 is offset the first portion 31 along the direction X.

Figure 3:
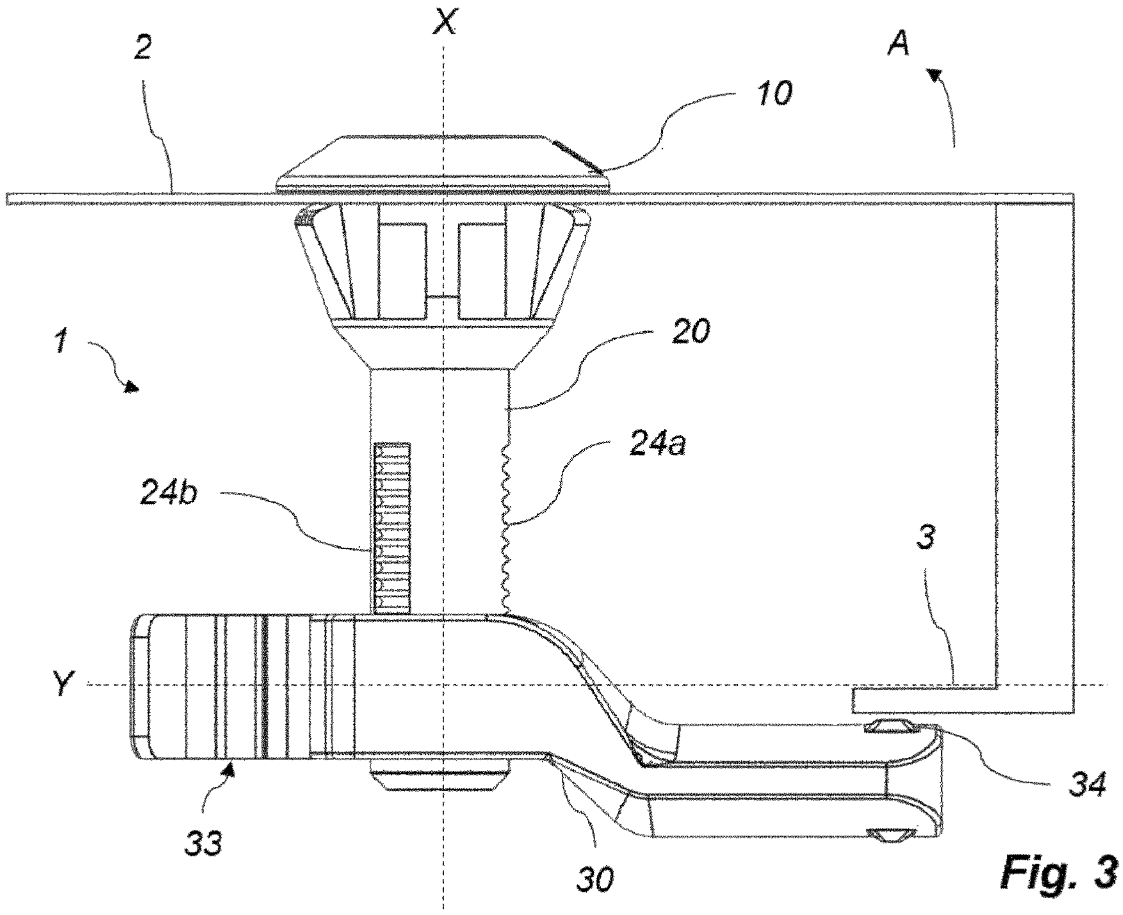
FIG. 3 shows a side view of a latch arranged to a door and door frame according to an embodiment of the invention.
Figure 4:
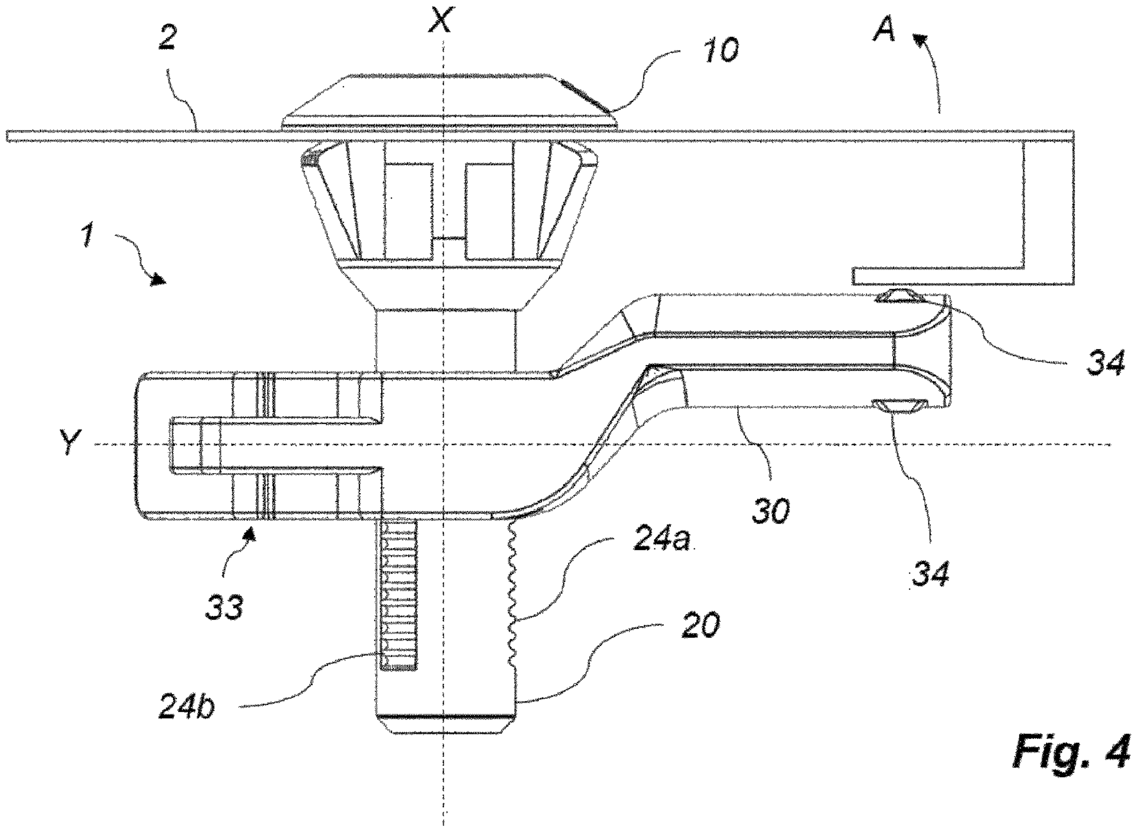
FIG. 4 shows a side view of a latch arranged to a door and door frame according an embodiment of the invention.
Figure 5:
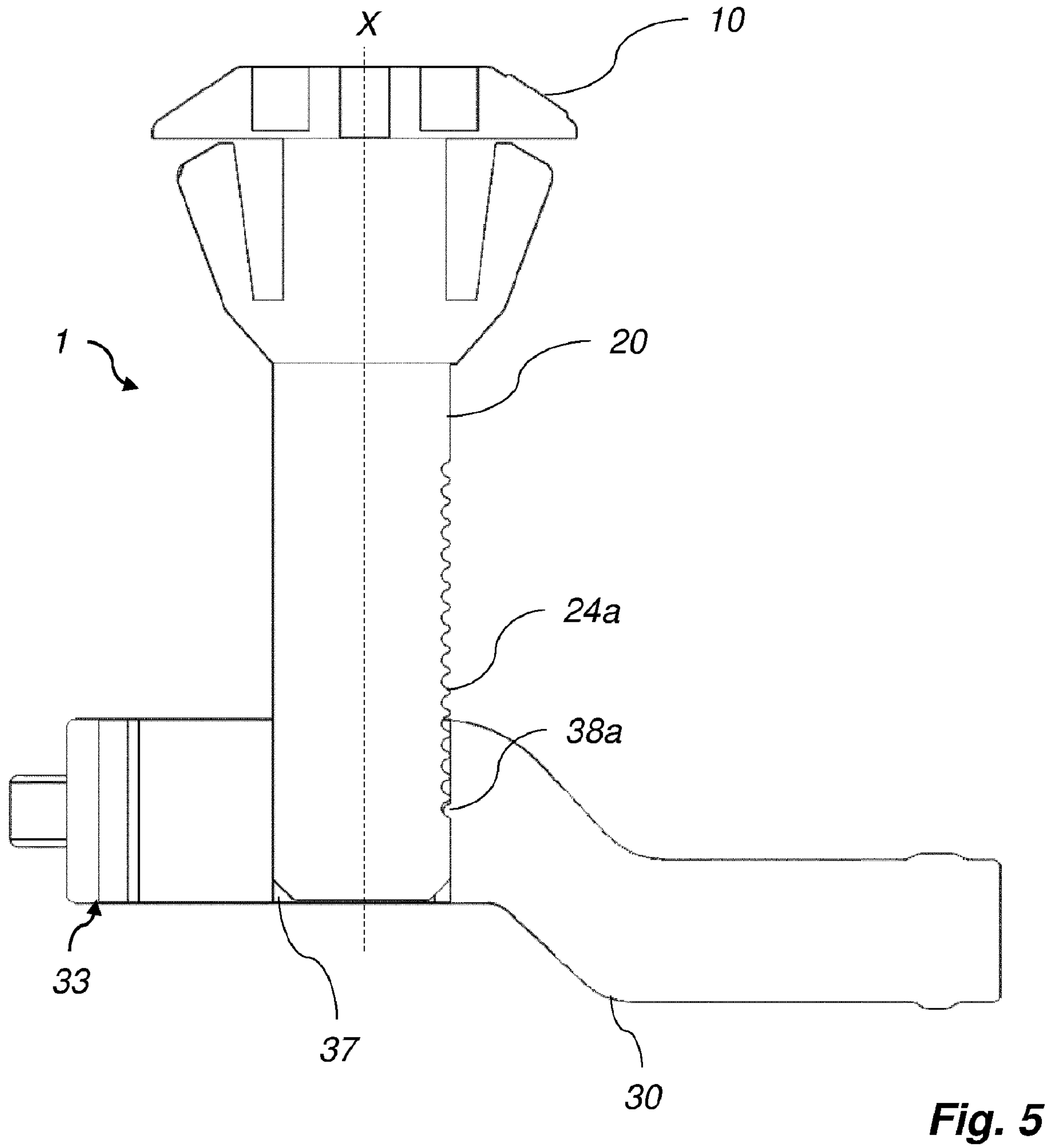
FIG. 5 shows a cross-sectional side view of a latch according to an embodiment of the invention.

As seen in FIGS. 3 and 4, the adjustability of the axial position of the cam 30 along the latch shaft 20 provides that the latch 1 can be adapted for different sizes and configurations of door frames 3. Depending on the distance between a door plane of the door 2, when the door 2 is closed, and door frame surface towards which the cam is intended to abut, the configuration of the latch needs to be different. By adjusting the axial position of the cam 30, the one and the same latch 1 can be used for different door and door frame configurations.

Further, due to the offset of the second portion 32 of the cam 30, and that the cam can be flipped relative to the latch shaft 20, the range of possible door and door frame configurations which the latch 1 can be used for is further increased. As seen in FIG. 3, the cam 30 is in the most extended axial position, and the cam 30 is flipped to an arrangement providing the longest possible distance between the door 2 and the door frame 3. In FIG. 4, the cam 30 is in the axial position closest to the attachment part 10, and the cam is flipped to an arrangement wherein the second portion 32 is offset towards the door 2, thereby providing the shortest possible distance between the door 2 and the door frame 3.

On the second portion 32 of the cam 30, either if the second portion 32 is offset the first portion 31 or not, it may comprise, at an end of the cam 30, a hold projection 34. As further seen in FIG. 10, the hold projection 34 is intended to interact with an opening 4 on the door frame 3. When the latch 1 is in the closed position, the hold projection's interaction with the opening thereby prevent unintended movement of the latch 1 towards the opened position.

FIG. 11 illustrates a latch 1 according to an embodiment of the present invention, in which the cam 30 extends straight perpendicularly relative to the latch shaft 20. Hence, the first portion 31 and the second portion 32 of the cam are not offset relative to each other.

FIG. 12 illustrate a cam 30 according to an embodiment where the cam 30 comprises a recess 51. The recess extends along at least a part of the second portion 32 of the cam 30. The recess 51 may further extend over a transition portion between the second portion 32 and the first portion 31. The recess 51 may have a depth at the second portion that is about half of the thickness of the cam 31 at the second portion 32. At the recess' extension at the transition portion, the depth of the recess may gradually decrease in a direction towards the first portion 31. The recess 51 may improve the properties of the cam 30 during manufacturing, such as preventing deformation or shrinking. It may further provide stability to the cam 30.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A latch for arrangement on a door and for locking the door relative to a door frame, comprising:

an attachment part configured to be arranged on the door, a latch shaft extending from the attachment part, a cam arranged on the latch shaft, the cam comprising an opening through which the latch shaft is configured to extend, wherein the latch shaft, when the latch is arranged to the door, is rotatable relative to the door to rotate the cam between an open position in which the door is openable relative to the door frame, and a closed position in which the door is locked to the door frame, the cam is in an open state or in a locked state, and wherein the axial position of the cam on the latch shaft is adjustable when the cam is in the open state, wherein the cam comprises an openable cam lock, wherein in an unlocked position of the cam lock, the cam is in the open state, and in a locked position of the cam lock, the cam is in the locked state, wherein the cam comprises a lock slit extending from the opening to the cam lock, wherein the lock slit is formed between two arms, wherein in the locked position of the cam lock, the cam lock is configured to press the two arms of the cam at respective sides of the lock slit towards each other to at least partly reduce the lock slit, such that a width of the opening is reduced compared to the unlocked position of the cam lock.

2. The latch according to claim 1, wherein the cam comprises at least one additional slit extending from the opening.

3. The latch according to claim 1, wherein the latch shaft comprises a plurality of indentations axially separated, and wherein the cam comprises, at an inner surface of the opening, at least one projection configured to interact with at least one of said indentations when the cam is in the locked state.

4. The latch according to claim 3, wherein the plurality of indentations is arranged as a first section in which the indentations are axially separated and circumferentially aligned along the circumference of the latch shaft, wherein the latch shaft further comprises an additional second section of indentations comprising a plurality of axially separated indentations circumferentially aligned along the circumference of the latch shaft, the indentations of the two sections are circumferentially separated, and wherein the cam comprises at least two projections on the inner surface of the opening at positions along the circumference of the opening corresponding to the circumferential positions of the sections of indentations.

5. The latch according to claim 1, wherein the opening in the cam is circular shaped with a cut flat portion, and the latch shaft has a cross-sectional shape being circular with a cut flat portion.

6. The latch according to claim 5, wherein at least one projection at the inner surface of the opening in the cam is arranged on the cut flat portion of the opening, and the first section of indentations on the latch shaft is arranged on the cut flat portion of the latch shaft.

7. The latch according to claim 1, wherein the cam extends in a direction perpendicular to the longitudinal extension of the latch shaft, wherein the cam extends in said direction in a first portion and a second portion, wherein the first portion is configured to be attached to the latch shaft and the second portion is configured to, when in use, interact with the door frame in the closed position, and wherein the second portion is offset the first section along the direction of the longitudinal extension of the latch shaft.

8. The latch according to claim 1, wherein the cam, at an end portion thereof which is configured to, when in use, interact with the door frame in the closed position, comprises a hold projection configured to interact with a corresponding opening or recess in the door frame.

9. The latch according to claim 1, wherein the cam, in the locked state, is fixed in the axial direction relative to the latch shaft.

10. A door arrangement comprising a door frame, a door openable relative to the door frame, and a latch according to claim 1 configured to enable or prevent opening of the door relative to the door frame when in the open position or the closed position.

* * * * *